INVENTORS
KEITH W. MILLER AND
HARRY D. SHRIVER.
BY Bosworth, Sessions,
Hystrom & Knowles
ATTORNEYS.

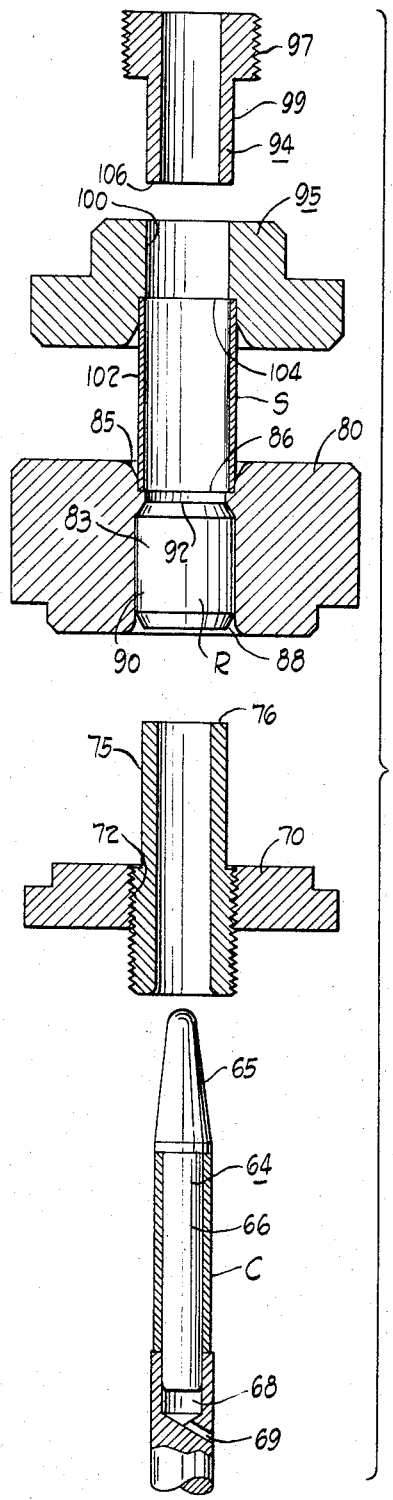
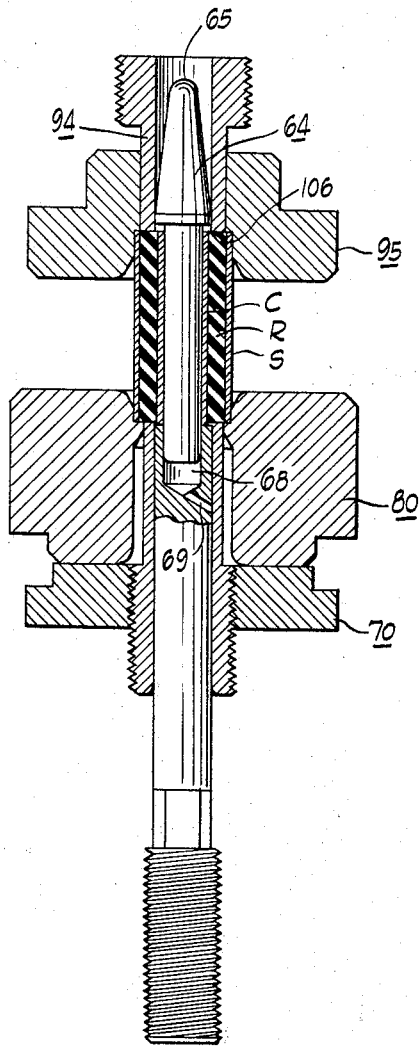
Fig. 2
Fig. 3

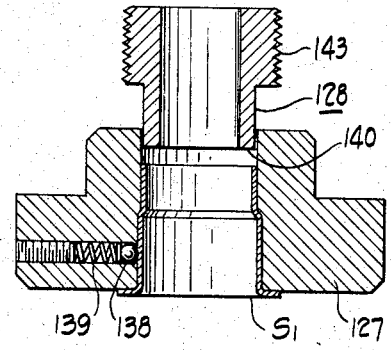
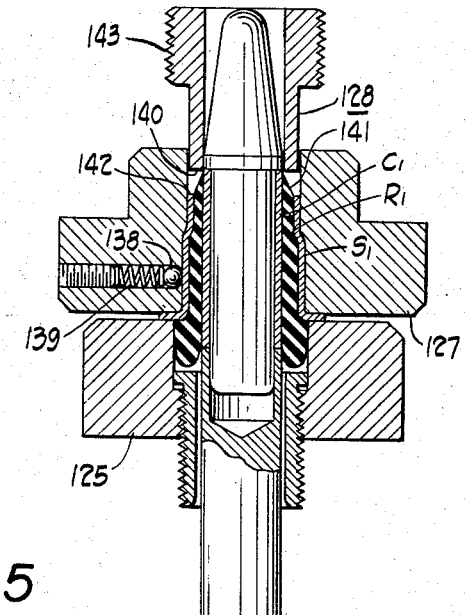
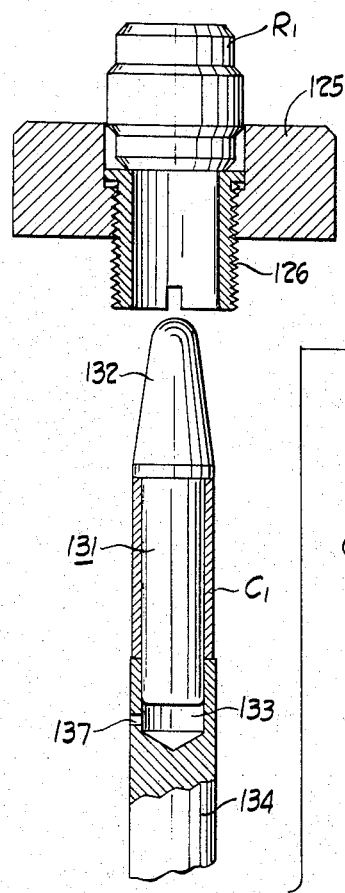
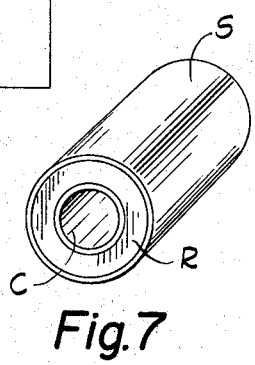
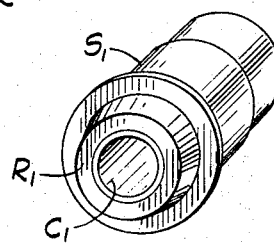
Fig. 5
Fig. 6
Fig. 7
Fig. 8
INVENTORS
KEITH W. MILLER AND
HARRY D. SHRIVER
BY
ATTORNEYS.

Oct. 10, 1967  K. W. MILLER ET AL  3,345,724
METHOD AND APPARATUS FOR MANUFACTURING RESILIENT BUSHINGS
Filed March 24, 1965  5 Sheets-Sheet 5

INVENTORS
KEITH W. MILLER AND
BY HARRY D. SHRIVER
Bosworth, Sessions,
Herstrom & Knowles
ATTORNEYS.

United States Patent Office 3,345,724
Patented Oct. 10, 1967

3,345,724
METHOD AND APPARATUS FOR MANU-
FACTURING RESILIENT BUSHINGS
Keith W. Miller, Roanoke, and Harry D. Shriver, Clifton
Forge, Va., assignors to H. O. Canfield Company,
Clifton Forge, Va., a corporation of Virginia
Filed Mar. 24, 1965, Ser. No. 442,253
10 Claims. (Cl. 29—149.5)

This invention relates to apparatus and methods for assembling an elastic tubular member under radial compression between an outer rigid tube and an inner rigid core.

Previously, numerous types of devices and methods have been devised to assemble resilient bushings of the rubber insert type. These apparatus and methods, however, exhibit certain disadvantages. For example, certain of these devices are relatively complex and require dexterous manipulation of the bushing elements by the operator. Further, certain of these devices and methods are relatively slow and uneconomical. Still further, separate machines are presently employed to insert or assemble bushings of the flanged type from the machines employed to assemble bushings of the cylindrical type.

Accordingly, it is an object of this invention to provide methods and apparatus which obviate the above mentioned disadvantages.

Another object of this invention, is to provide an improved method for assembling resilient bushings of the rubber insert type.

A further object of this invention is to provide an improved apparatus for assembling bushings of the rubber insert type which apparatus can be readily converted from one type of machine to another.

A still further object of this invention is to provide an improved apparatus for assembling resilient bushings which apparatus can be quickly and easily converted to assemble bushings of the flanged type or bushings in which the outer sleeve is entirely cylindrical.

Briefly, in accordance with aspects of this invention, we have discovered an improved method and apparatus for assembling resilient bushings employing a frame which supports a pair of opposed pistons with axially aligned piston rods. Each piston rod has a ram mounted thereon and the rods are in axial alignment with each other. A stationary platform is mounted on the frame and supports a tool in axial alignment with the rams, and a movable platform is slidably mounted on the frame for supporting a tool in axial alignment with the rams and the stationary platform. Advantageously, the movable platform has a tool support thereon capable of supporting an outer cylindrical sleeve and supporting the resilient tubular member in axial alignment with the outer sleeve. Also, advantageously, a surface on the tool separates the tubular elastic member from the cylindrical sleeve, which surface tapers radially inwardly toward the axis of the outer cylindrical member. A pusher member is mounted on the stationary platform and is of hollow cylindrical construction such that when the first ram engages the outer sleeve on the movable platform and pushes the movable platform toward the stationary platform, the pusher engages the elastic tubular member and pushes the elastic tubular member through the funnel surface and into the outer sleeve. Subsequently, the second piston drives the second ram through the pusher and into the outer sleeve carrying the core into the elastic tubular member.

Advantageously, the above described method and apparatus may be quickly and easily modified to assemble resilient bushings of the flanged type. The operator removes the moving platform, changes the tooling on the stationary platform, head and second ram, positions the rubber insert on the new tooling on the stationary platform, and positions the flanged outer sleeve within the head of the first ram where the sleeve is frictionally held. Subsequent actuation of the first piston drives the first ram carrying the flanged outer sleeve into engagement with the rubber insert on the stationary platform such that the rubber insert starts to enter the flanged outer sleeve with the inner surface of the flanged outer sleeve acting as a funnel for the rubber insert. Subsequently, the second ram is actuated, carrying the core through the stationary platform and into the rubber insert. The core and core guide frictionally engage the inside surface of the rubber insert.

In accordance with another embodiment of this invention, methods and apparatus are provided including a frame having a first and a second axially aligned ram and separate pistons operatively associated with each of the rams, a stationary platform positioned with an aperture therein in alignment with the axes of the rams and mounted between the rams, and a movable platform movably mounted on the frame for movement in an axial direction relative to the rams and supporting a removable tool having an aperture therein axially aligned with the rams. Preferably, the tool mounted on the movable platform includes a cylindrical surface terminating in a shoulder for receiving an outer sleeve of a resilient bushing and has an oppositely directed frusto-conical surface terminating adjacent the shoulder for acting as a funnel to guide the rubber insert into the outer sleeve. Preferably also, the stationary platform is provided with a pusher for the resilient insert and an alignment means for supporting the resilient insert on the pusher such that the pusher pushes the rubber insert through the frusto-conical surface into the outer sleeve when the first ram engages the outer sleeve and pushes the movable platform through the length of its stroke in a direction toward the stationary platform. Subsequently, the second pneumatic piston is actuated and drives the core carrying second ram through the aperture in the stationary platform, the aperture in the pusher and through the movable platform into the resilient insert.

This embodiment of apparatus may be readily converted to an apparatus which will assemble resilient bushings having flanged outer sleeves. The operator changes the relatively small tooling and removes the movable platform. A modified head tooling is employed and the flanged outer sleeve is now mounted in the head tooling where the sleeve is held by means of a spring loaded ball type detent. Actuation of the first pneumatic piston moves the head and flanged outer sleeve toward the resilient insert supported on the stationary platform. The inner surface of the flanged outer sleeve acts as a funnel for the resilient insert. The moving head forces the flanged outer sleeve over a portion of the resilient insert. Subsequently, the second ram carries the core through the aperture in the stationary platform and into the resilient insert. The frictional force of the core on the insert carries the insert the rest of the way into the outer sleeve.

Other objects and advantages relates to certain novel features of construction and combinations and arrangements of parts which provide economy in manufacture and installation. The invention is described in connection with the accompanying drawing, forming a part of the specification and illustrating the preferred embodimnets which represent the best known modes of practicing the invention.

In the drawings:

FIG. 2 is an exploded cylindrical sectional view of the tooling arrangement of FIG. 1, to an enlarged scale, showing elements of a cylindrical resilient bushing mounted on the respective portions of the tooling members;

FIG. 3 is a cylindrical sectional view of the tooling of FIG. 2 shown in a position of cooperation with a cylindrical bushing completely assembled;

FIG. 5 is an exploded cylindrical sectional view, showing the tooling of the apparatus of FIG. 4, to an enlarged scale;

FIG. 6 is a cylindrical sectional view of the tooling of FIG. 5 showing the tooling in a position of cooperation with a flanged bushing completely assembled;

FIG. 7 is a view in perspective of a cylindrical type bushing assemblled by the apparatus of FIGS. 1, 2 and 3;

FIG. 8 is a view in perspective of an assembled bushing of the type assembled by the apparatus of FIGS. 4, 5 and 6;

Figure 1:
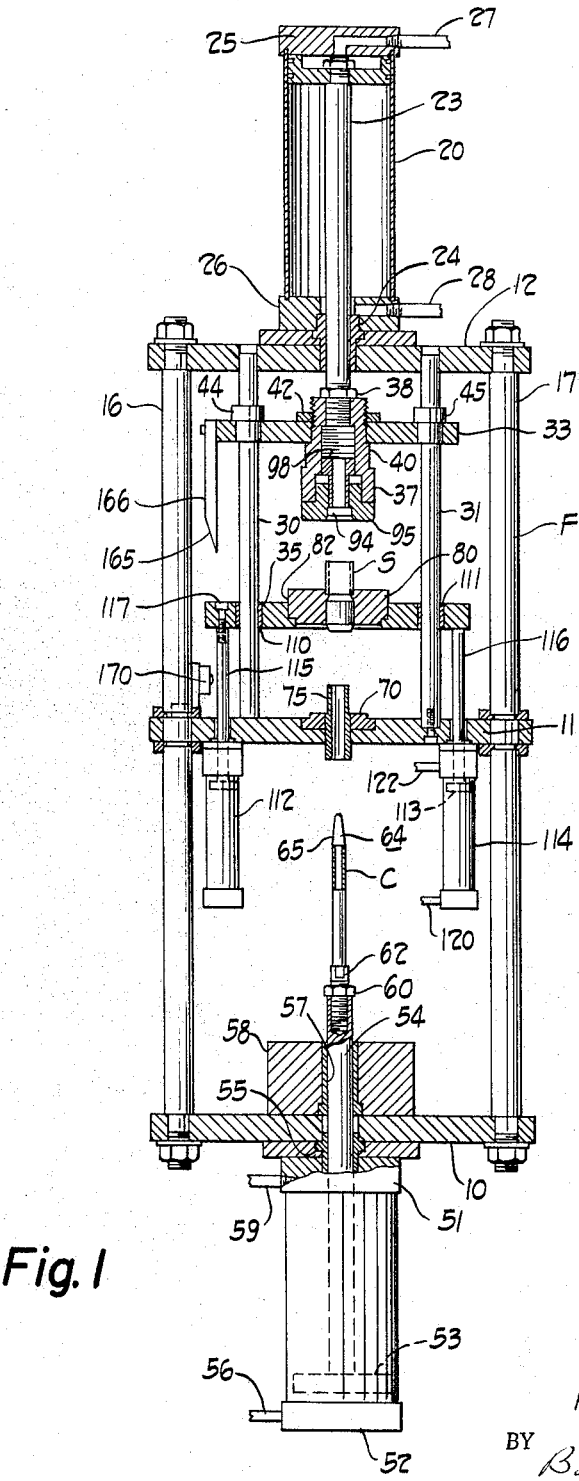
FIG. 1 is a view in elevation, partly in section, of the bushing assembly apparatus according to one illustrative embodiment of this invention.

Referring now to FIG. 1, there is depicted in elevation, partly in section, the major portion of the apparatus for assembling a cylindrical type bushing such as shown in FIG. 7, which includes an inner core C preferably of metal, a ring or insert R made of a suitable resilient material such as rubber, and an outer sleeve S also preferably of metal with the resilient sleeve R compressively held between the core C and the sleeve S and in which the outer sleeve is a right circular cylinder. The apparatus of FIG. 1 includes a frame F having a plurality of platforms, such as the platforms 10, 11 and 12 connected by a plurality of parallel rods such as the cylindrical rods 16, 17 which hold the platforms 10, 11 and 12 in rigid parallel relationship relative to each other. A first ram means including a cylinder 20 is mounted on the platform 12 and has a piston 22 slidably mounted therein with a piston rod 23 secured thereto and slidably journalled in a bushing 24 in the platform 12. The cylinder 20 has a pair of endwalls 25, 26 connected to opposite ends thereof. An air conduit 27 is connected to the endwall 25 and an air conduit 28 is connected to the endwall 26. The introduction of pressurized air through the conduit 27 will move the piston 22 downwardly, as viewed in FIG. 1. Similarly, the introduction of pressurized air to the conduit 28 will move the piston 22 upwardly, as viewed in FIG. 1.

A plurality of guide rods, such as the rods 30, 31 are secured between the platforms 11, 12 in parallel relationship to act as guides for moving platforms such as the platforms 33, 35. A head 37 is threadably engaged on the end of the piston rod 23 and is locked thereto by a locking nut 38. Head 37 has an annular shoulder 40 which engages the surface of the platform 33 and the reduced neck portion of the head 37 extends through the platform 33 and is secured to the platform by means of a nut 42 threadably engaging the reduced neck portion.

The guide rods 30, 31 have enlarged annular stop portions 44, 45, respectively, which stop portions act as stops for the platform 33. Pressurized fluid, such as air, within the cylinder 20, fed through conduit 28, normally maintains the piston 22 in its uppermost position, as shown in FIG. 1 with the sliding platform in engagement with the stops 44, 45.

A second ram means including a cylinder 50 is mounted on the platform 10 and includes a pair of endwalls 51, 52. The second ram means includes a piston rod 54 slidably journalled in a bearing 55 held between the end 51 of the cylinder 50 and the platform 10. Rod 54 is also slidably journalled in a bushing 57 mounted in a block 58 on the opposite surface of the platform 10 from the cylinder 50. the end of the piston rod 54 is internally threaded at 59 to threadably receive an adapter sleeve member 60 which is locked in position by means of a locking nut 62 and has a smooth bore 63 in the opposite end slidably to receive a core guide 64. Adapter sleeve 60 may be quickly and easily removed and a different adapter sleeve inserted to modify the apparatus for different tooling arrangements. Core guide 64 has a conical end portion 65 which tapers from a diameter at least equal to the outer diameter of the core C and a reduced neck portion 66 for receiving the core C. The end of the reduced neck portion 66 is inserted in the bored recess 63 in the end of the adapter sleeve 60. The adapter sleeve 60 is provided with a radially extending air passage 67 extending into the recess 63 to eliminate any suction from preventing the ready removal of the guide member 64.

The stationary intermediate platform 11 has an aperture 68 therein with an annular shoulder 69 for receiving a cylindrical tool supporting plate 70. The plate 70 has a threaded aperture 72, the axis of which is aligned with the axis of the core guide 64. The threaded passage 72 threadably receives an annular pusher member 75. The pusher member 75 has a cylindrical or annular surface 76 on the end thereof for pushing the rubber sleeve R into the outer sleeve S in a manner which will be subsequently described.

An annular tool 80 is mounted in a suitable circular recess 82 in the moving platform 35 and has a recessed shoulder 83 engaging an annular shoulder 84 in platform 35 and an aperture or passage 85 therein axially aligned with the axis of the passage through the cylindrical member 75 and with the axis of the guide member 64. The tooling member 80 has a funnel-shaped surface 86 on the upper surface thereof which terminates in a cylindrical shoulder 87. On the opposite side of the tooling member 80, from the funnel-shaped surface 85, is a second funnel-shaped surface 88 which joins a cylindrical section 90. Section 90 is separated from the shoulder 87 by a funnel-shaped surface 92. In the operation of this apparatus, the funnel-shaped surface 92 applies a radially compressive force to the rubber sleeve R to squeeze the sleeve R into the outer sleeve S under the force of the annular pusher member 75.

A pair of annular members 94, 95 are mounted in the head 37 to cooperate with the tooling members 64, 75, 80 in a manner which will be subsequently described. The member 94 has a threaded portion 97 which threadably engages a threaded surface 98 in the head 37 and a reduced cylindrical portion 99 which extends downwardly as shown in FIGS. 1 and 3. The annular member 95 has a smooth cylindrical bore 100 which slides over the reduced cylindrical portion 99 and has an outwardly facing funnel-like surface 102 which terminate in an annular shoulder 104. An annular surface 106 of the member 94 acts as a back-up member for the rubber sleeve R when the bushing is being assembled accurately to center the rubber sleeve axially relative to the core C and the outer sleeve S.

When assembling a cylindrical resilient bushing of the type shown in FIG. 7, with the apparatus of FIG. 1, 2 and 3, the operator first inserts a rubber sleeve R into the annular tool 80 from the bottom thereof and a slight compression of the rubber sleeve R retains the rubber sleeve R in a position shown in FIG. 2. The operator also positions the outer sleeve S into the funnel surface 85 and into a position of engagement with the annular shoulder 86 as shown in FIGS. 1, 2 and 3. The core C is positioned on the guide member or tapered pilot 64 and the guide member 64 is positioned with its reduced cylindrical portion 66 resting in the bore 68 of the adapter 60. A suitable pneumatic system, which will be subsequently described, provides means for sequentially actuating the first and second ram means. The first ram means including the piston 22 in the cylinder 20 moves the head 37 downwardly until the tool member 95 engages the sleeve S and the upper surface of the sleeve S abuts the annular recess 104, which positional relationship is shown in FIG. 2. As the first ram means, including the head 37, continues to move downwardly, as viewed in FIG. 1, under the force of pressurized air from the conduit 27, the head 37 pushes the sliding platform 35 downwardly until the pusher member 75, with its annular surface 76, engages the lower surface of the rubber sleeve R. Subsequent movement of the head 37 downwardly forces the tool 80 into a position in which the pusher 75 enters the cylindrical bore 85 and pushes the rubber sleeve R through the funnel surface 92 into the outer sleeve S, as shown in FIG. 3. The second ram means is actuated after the first ram means is fully actuated such that the piston 22 and platform 35 are at their lower terminal positions adjacent the stationary platform 11, as shown in FIG. 3. Actuation of the second ram means is accompanied by introducing fluid under pressure to the lower end of cylinder 50, as viewed in FIG. 1, through conduit 108. This pressurized fluid behind piston 53 moves the piston 53 upwardly in the cylinder 50, moving the guide 65 into the position shown in FIG. 3 in which the guide carries the core C into the rubber sleeve R and into the outer sleeve S. Although the frictional engagement between the guide point 65 and the rubber sleeve R will tend to force the rubber sleeve R out of the outer sleeve S, this movement is prevented by the pusher surface 106 of the pusher member 94. Thus, the pusher surfaces 106 and 76 will assure accurate axial positioning of the rubber sleeve R between the core C and the outer sleeve S. After the cylindrical bushing is assembled, the piston 53 is retracted, or moved downwardly, as viewed in FIG. 1, by the introduction of fluid under pressure to the upper endwall member 51 through the conduit 107 and the release of the pressure of the fluid in conduit 108. This fluid pressure causes the piston rod 54 to retract to its initial position, shown in FIG. 1. After the piston 53 is retracted, the piston 22 is retracted by the introduction of fluid under pressure into the conduit 28 and the release of the pressure in the conduit 27 to thus cause the piston 22 to return to its upper limiting position, as shown in FIG. 1. With this positional relationship, the assembled bushing may now be manually removed from the tooling 80 and the guide 64 may be manually removed from the assembled bushing and reinserted in a core C and repositioned on the end of adapter 60. The apparatus is now ready to assemble the next resilient bushing. The operator now positions a new sleeve S on the upper cylindrical shoulder of tool 80 and positions a new rubber sleeve R in the lower cylindrical surface of the tool 80 and actuates the fluid motor system in a manner which will be subsequently described.

When the piston 22 is returned to its upper terminal position, as shown in FIG. 1, the sliding platform 35 is returned to its normal position, shown in FIG. 1, by means of a pair of identical air springs including cylinders 112, 114, only the latter of which will be described in detail. These air springs house pistons, such as 113, which cooperates with push rod 116, the ends of which is secured to platform 35 by means of threaded bolts such as the bolt 117, in rod 115. Pressurized air is normally maintained behind the piston 113 by means of the inlet conduit 120. The opposite side of piston 113 from the inlet conduit 120 is vented to the atmosphere by a suitable means such as an outlet conduit 122.

Figure 4:
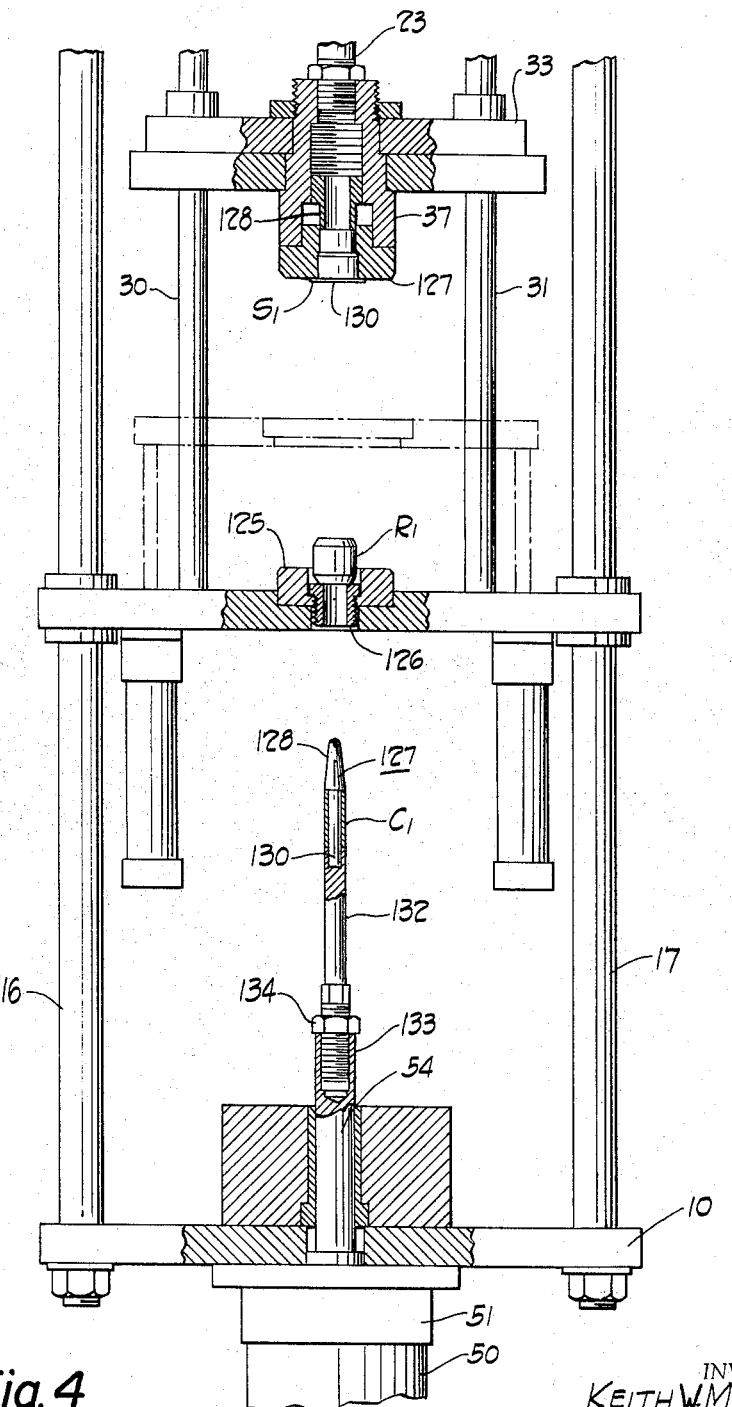
FIG. 4 is a view similar to FIG. 1, partly in section and partly broken away, showing the apparatus of FIG. 1 modified to assemble a flanged type bushing.

The apparatus of FIG. 1 can be modified to produce flanged type resilient bushings, which modifications are represented in FIG. 4. A tooling member 125 is substituted in the stationary platform 11 for the tooling member 70 of FIG. 1 and the annular tool 80 is removed to permit the head 37 to pass through platform 35 and cooperate with tool 125. Also, a separate tool member 127 is substituted in the head 37 for the member 95. Similarly, a larger pusher ring 128 has been substituted for the pusher ring 94 in FIGS. 1, 2 and 3. The apparatus of FIG. 4 is employed to assemble a flanged type rubber bushing of the type shown in FIG. 8 which includes a core C1, a resilient rubber sleeve R1, an outer flanged sleeve S1. In assembling this bushing, it is not necessary to employ a funnel type surface for compressing the resilient sleeve R1 inside the outer sleeve S1 because of the bell-shaped inside surface 130 of the outer sleeve S1 which inner surface acts as a funnel to receive the rubber sleeve R1. Accordingly, the movable platform 35 and its supporting piston rods 115, 116 are not required and may remain or may be removed.

Because this particular embodiment of resilient bushing requires a larger core C1 than the core C of FIG. 1, a different guide 131 is employed having a tip 132 which tapers outwardly to a diameter substantially equal to the outer diameter of the core C1. The guide 131 is positioned in the bore 133 of an adapter 134, which adapter is threadably engaged at 135 to the end of the piston 54 and is locked in this position by means of a locking nut 136. An air vent 137 is provided in adapter 134 to facilitate release of guide 131.

FIG. 5 is an exploded view showing the tooling of the embodiment of FIG. 4 in a disengaged position and with the tooling 131, 125 and 127 supporting the components C1, R1 and S1, respectively. Support of sleeve S1 is achieved with the aid of a ball-type detent 138 which is held in place by a spring 139 which forces the ball 138 against the surface of the sleeve S1 to thus maintain the sleeve in position. Pusher ring 128 has an annular surface 140 for pushing the upper end of the rubber sleeve R1 in a manner shown in FIG. 6, which is a view showing the tooling in a position of cooperation. In this particular instance, the pusher member 128 has its pushing surface 140 spaced from the end 141 of the sleeve S1 such that the rubber ring, or sleeve, R1 will be pushed beyond the end 142 of the sleeve S1. If, however, it is desired to have the end of the rubber sleeve R1 lie in a plane substantially co-planar with the edge 139 of the outer sleeve S1, then the pusher sleeve 128 is rotated relative to head 37, until the surface 140 touches the end 142 of the sleeve S1.

The operation of the first and second ram means, only portions of which are shown, remains the same as that described with respect to FIG. 1. The operator positions the core C1 on the guide 131, positions the guide 131 in the bore 133 of the adapter 134 and positions a rubber ring R1 in the circular aperture in the tool 125. The operator also positions the outer sleeve S1 in the tooling 127. After the elements of the rubber bushing are positioned on the machine, the first ram means, including head 37, is actuated to bring the outer sleeve S1 into a position over or encircling the top portion of the rubber sleeve R1. The second ram means is actuated to force the guide carrying the inner sleeve or core, C1 into the rubber ring R1 and into the outer sleve S1. The frictional engagement between the guide 131, core C1 and the inner surface of the sleeve R1 carry the rubber ring R1 into the proper position within the outer sleeve S1. The operation of either the apparatus of FIG. 1, or the apparatus of FIG. 4, can be carried out semi-automatically under the control of an operator in a manner which will be subsequently described.

Figure 9:
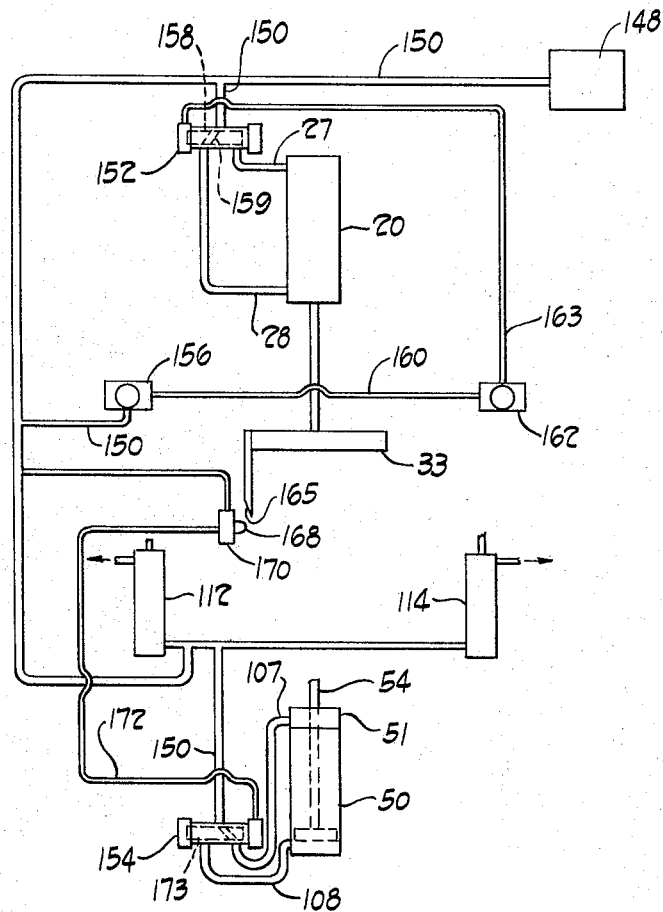
FIG. 9 is a pressurized fluid conduit system for actuating the assembly apparatus of FIGS. 1 and 4.

A pneumatic system which may be employed to operate the apparatus of FIGS. 1 and 4, is shown diagrammatically in FIG. 9. In this system, a pump 148, or other suitable source of compressed air, supplies air through a main supply line 150. The main supply line 150 is connected to a first compressed air operative valve 152, a second compressed air operative valve 154 and a palm button 156, or other suitable manually operable valve. The construction of the palm button 156, or manually controlled valve, is such that when operated, it connects the main line 150 through an air line 160 to a second palm button 162. Air pressure in line 150 maintains the slide 158 in its left hand position, as viewed in FIG. 9, in which the main air line 150 is connected to the conduit 28 at the bottom of the cylinder 20 through a passage 159 in slide 158. With this arrangement, the piston 22 is normally maintained in its retracted position, as shown in FIG. 1. If the operator depresses both palm buttons, or manually actuated valves, 156, 162, the main air line 150 is connected through a feeder line 160 to an air line 163 which communicates with the left hand side of the slide valve 152 and moves the slide member 158 to the right as viewed in FIG. 9. In this position, member 158 connects the main air line 150 through line 27 to the top of the cylinder 20. The piston 22 now moves downwardly as viewed in FIG. 1. The movement of the slide 158 to the right as viewed in FIG. 9, also vents the conduit 28 to the atmosphere releasing the pressure beneath the piston 22. The piston 22 moves downwardly driving the sliding platform or head guide 33. The sliding platform 33 has a depending cam surface 165 on the lower end of the finger 166 mounted on the side of the head guide 33 by means of a block 167. In the lower terminal position of head guide 33, the cam surface 165 of finger 166 engages an air valve controlling button 168 of an air valve 170. As shown in FIG. 9, the air valve 170 may be actuated to connect the main supply line 150 to the right hand side of slide valve 154, with button 168 in its normal position. The main line 150 supplies air to the right hand side of the slide valve 154. This pressure normally maintains a slide member 173 in its left hand position, as viewed in FIG. 1 causing the main line 150 to be normally connected through the line 107 to the top end member 51 of the cylinder 50. This pressure normally maintains the piston rod 54 in its retracted position. When the cam surface 165 engages the button 168, valve 170 connects line 150 to a line 175 on the left hand end of the slide valve 154, as viewed in FIG. 9. This actuation of the valve 170 connects the line 172 to the main line 150 which causes the slide valve 173 to move to the right, as viewed in FIG. 9, and connect the supply line 150 through the line 108 to the bottom of cylinder 50. This movement of the slide 173 also vents the line 107 to the atmosphere and permits the piston 53 to move upwardly as viewed in FIGS. 1 and 9, such that the core C or C1 is driven into the rubber R or R1, respectively, in a manner previously described.

Figures 10, 11:
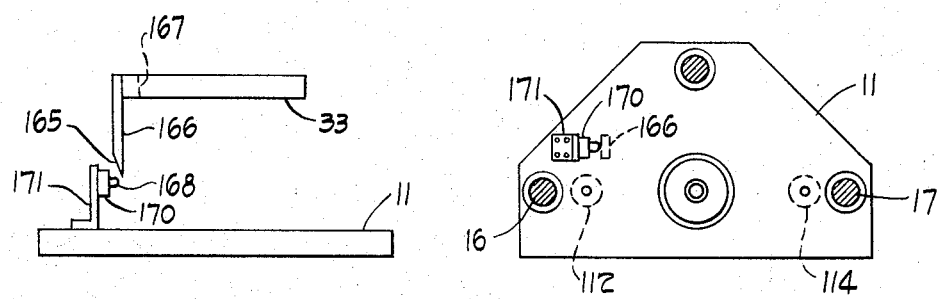
FIG. 10 is a view in elevation of a stationary platform and a movable platform and cooperating fluid control elements on the platforms.
FIG. 11 is a plan view of the stationary platform of FIG. 10.

The valve 170 is mounted on a suitable mounting bracket 171 secured to the upper surface of the stationary platform 11. The location of the bracket 171 in the valve 170 relative to the stationary platform 11 is also shown in FIG. 11, which figure also shows, in dotted outline, the cam surface carrying member 166 above the button 168. After the piston 53 has reached its upper terminal position, the operator releases the palm buttons 156, 162 which causes the slide 158 to be shifted to the right, as viewed in FIG. 9, connecting the main line 150 to the conduit 28 at the bottom of cylinder 20. Air pressure forces the piston 22 upwardly, as viewed in FIGS. 1 and 9. As the cam surface 165 clears the button 168, the valve 170 is restored by a spring, not shown, to its initial position. The main line 150 normally applies pressure to the left hand side of the slide valve 154 through the slide 154, causing the slide to move to the right and connecting line 150 to line 107, causing the piston 53 to be retracted. At the completion of this retraction, the apparatus is ready to perform another assembly operation.

In accordance with the patent statutes, the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:

1. A machine for assembling stressed rubber bushings having an outer sleeve, an inner sleeve and a rubber insert compressively held between said sleeves comprising:

a frame;

platform means movably mounted relative to said frame for supporting said outer sleeve and said rubber insert;

a carrier movably mounted on said frame for clamping said sleeve against said platform means and having an aperture therein formed by a funnel surface for funneling said rubber insert into said sleeve during assembly;

first ram means for pushing said rubber insert through said funnel surface and into said sleeve;

second ram means for moving a tapered pilot and said inner sleeve into the rubber insert, whereby said second ram means moves through the platform while the outer sleeve is clamped between said platform and the carrier and whereby the rubber insert is forced into the sleeve and is held therein against displacement by first ram means;

means for moving said second ram through said platform while said outer sleeve is clamped between said platform and said carrier; and means for forcing said rubber insert into said outer sleeve, said first ram means holding said sleeve against displacement.

2. A machine for assembling stressed rubber bushings including an outer sleeve, a rubber insert and an inner sleeve comprising:

a frame;

a platform movably mounted on said frame;

locating means for receiving said sleeve and having an aperture defined by a cylindrical surface for supporting said insert during assembly and a funnel surface for funneling said rubber insert into said outer sleeve during assembly;

a first ram having a head thereon for engaging and holding said outer sleeve against said locating means, a pusher mounted on said frame for engaging and moving said platform relative to said frame;

a second ram surmounted by a tapered pilot and carrying said inner sleeve; and motor means for moving said second ram through said pusher and said funnel surface while said outer sleeve is clamped between said platform and said head, said motor means including means for forcing said rubber insert into said sleeve, said first ram including means for holding said sleeve against displacement during the insertion of said rubber insert in said outer sleeve.

3. A machine for assembling rubber bushings including an outer sleeve, a rubber insert and an inner sleeve comprising:

a frame;

a platform on said frame having an aperture therein and means for supporting said outer sleeve in alignment with said aperture;

a carrier for clamping said sleeve against said platform and having a rubber insert support and a funnel surface thereon, said insert and surface aligned with said outer sleeve for funneling said rubber insert into said sleeve;

first ram means for pushing said rubber insert through said funnel surface into said outer sleeve; and second ram means including a tapered pilot supporting said inner sleeve and means for actuating said ram means.

4. A machine for assembling rubber bushings including an outer sleeve, a rubber insert and an inner sleeve mounted within said rubber insert comprising:

frame means;

platform means movably mounted on said frame means including means for holding said outer sleeve and said insert and a funnel surface thereon for funneling said rubber insert into said outer sleeve;

first ram means for pushing said rubber insert through said funnel surface and into said outer sleeve; and second ram means surmounted by a tapered pilot for carrying an inner sleeve into said rubber insert.

5. A machine for assembling rubber bushings including an outer sleeve, an inner sleeve and a resilient insert compressively held between said sleeves comprising:

a frame;

a pair of cylinders connected to said frame, each having a piston therein with a rod connected thereto, said pistons being mounted in axial alignment for work strokes toward each other;

a stationary platform mounted on said frame between said cylinders and having an aperture axially aligned with said pistons;

means for mounting said resilient insert between said stationary platform and one of said rods and in axial alignment with said rods;

means for mounting said outer sleeve between said resilient insert and said one of said rods, said one of said rods including die means for engaging said outer sleeve; and means on the other of said rods for mounting said inner sleeve and a surmounted tapered pilot whereby movement of said one rod toward said stationary platform forces said resilient insert into one end of said outer sleeve and whereby movement of said other rod toward said stationary platform moves said pilot and said inner sleeve into said resilient insert and into said one end of said outer sleeve.

6. The apparatus according to claim 5 wherein said means for mounting said resilient insert and said means for supporting said outer sleeve comprise a sliding platform slideably mounted on said frame between said stationary platform and said one rod and having an annular tool therein with the aperture thereof aligned with said rods, said tool including a recess on one side thereof to receive said outer sleeve, a recess on the other side thereof to receive said resilient insert and a tapered surface intermediate said recesses to radially compress said resilient insert as said insert passes therethrough.

7. The apparatus according to claim 5 wherein said means for engaging said outer sleeve includes a die mounted on said one rod and wherein said means for supporting said resilient insert comprises an annular tool mounted on said stationary platform in axial alignment with said rods, said tool having a recess therein to receive said insert.

8. A method for assembling stressed rubber bushings employing apertured platform means, said bushings including an outer sleeve, a rubber insert and an inner sleeve within said insert comprising the steps of:

positioning said resilient insert on one side of said platform means in axial alignment with said aperture;

positioning said outer sleeve adjacent said rubber insert in axial alignment therewith and remote from said platform means;

positioning a tapered pilot in said inner sleeve and positioning said pilot and inner sleeve on a mandrel in axial alignment with said outer sleeve and said insert;

moving said outer sleeve toward said stationary platform means until said platform means forces said insert into said outer sleeve; and moving said mandrel toward said one end of said outer sleeve until said pilot and said inner sleeve are moved into the aperture in said platform means and are forced into said rubber insert.

9. A method for assembling a rubber bushing employing a stationary platform having an aperture therein and a pair of opposed reciprocating rod means axially aligned with and on opposite sides of said aperture, said bushing including an outer sleeve, an annular rubber insert and an inner sleeve comprising the steps of:

mounting said sleeves in axial alignment with and spaced from opposite ends of said rubber insert;

forcing said rubber insert into one end of said outer sleeve by moving one rod means axially toward said platform; and forcing said inner sleeve into said one end of said outer sleeve and into said rubber insert by moving the other of said rod means toward said platform and into said aperture.

10. A method for assembling rubber bushings including a flanged outer sleeve, a rubber insert and an inner sleeve by employing a stationary platform means having an aperture therein and a pair of opposed rod means axially aligned with and on opposite sides of said aperture comprising the steps of:

mounting said outer sleeve in a die on one end of one of said rods;

positioning said rubber insert in axial alignment with said outer sleeve between said stationary platform means and said outer sleeve;

positioning said inner sleeve and a surmounted pilot on one end of the other of said rod means;

forcing said insert against said platform means and into one end of said outer sleeve by advancing said one rod means axially toward said platform means; and forcing said pilot and said inner sleeve through said aperture in said platform means, into said one end of said outer sleeve and into said rubber insert by axially advancing the other of said rod means toward said platform means.

References Cited

UNITED STATES PATENTS

| | | | |
|---|---|---|---|
| 1,830,814 | 11/1931 | Thiry | 29—235 X |
| 1,961,536 | 6/1934 | Thiry | 29—149.5 |
| 2,550,564 | 4/1951 | Hutton | 29—235 |
| 2,632,236 | 3/1953 | Dodge | 29—149.5 |
| 2,660,780 | 12/1953 | Beck | 29—235 |
| 2,877,543 | 3/1959 | Myers | 29—235 |

THOMAS H. EAGER, *Primary Examiner.*